Patented June 23, 1942

2,287,699

UNITED STATES PATENT OFFICE 2,287,699

STABILIZED DICALCIUM PHOSPHATE

Henry V. Moss and Maurice G. Kramer, St. Louis, Mo., assignors to Monsanto Chemical Company, a corporation of Delaware No Drawing. Application February 15, 1940, Serial No. 319,108

7 Claims. (Cl. 23—109)

This invention relates to an improved dentifrice and dental polishing agent for use in tooth paste and tooth powders. The dental polishing agent herein particularly contemplated is an improved form of dicalcium phosphate dihydrate. It also relates to an improved form of dicalcium phosphate dihydrate, per se.

Dicalcium phosphate has been used in dental preparations for many years usually in the form of the dihydrate, of which the chemical formula is $CaHPO_4.2H_2O$. This material, however, has several faults which have combined to restrict the use of this material in dentifrice preparations.

One of the difficulties encountered in the use of this material in dentifrice preparations is that unless storage of the product is maintained at a relative low temperature there is a distinct tendency to lose water of crystallization. Another difficulty which has been encountered is that there is a tendency for the product to "set up," or become lumpy, a condition which is highly undesirable in a tooth paste because of the difficulty of extruding the paste from the ordinary tooth paste tube.

Various means have been proposed for increasing the stability and overcoming the lumping tendency, most of which means comprise the addition of varying amounts of stabilizing agent.

We have now discovered that dicalcium phosphate dihydrate may be prepared in a form of greater stability, free of the tendency to "set up," by a treatment which may be applied during its manufacture, thus avoiding any external additions of foreign substances. According to our present invention a dicalcium phosphate is prepared in the usual manner by the addition of lime slurry to phosphoric acid, under conditions so that the dicalcium phosphate dihydrated compound is precipitated. After precipitation is complete we add to the mother liquor containing the precipitate a small proportion of alkali metal pyrophosphate, and then heat the slurry to a temperature somewhat above the precipitation temperature, at which elevated temperature the slurry is maintained for a short period of time. During this period the pH of the mother liquor is maintained above a pH of 7 by increment additions of a tetra alkali metal pyrophosphate. The mother liquor is removed from the slurry by decantation, an additional amount of wash water is added to the precipitate after which the precipitate is removed in the usual manner as by filtration. Instead of treating the mother liquor with the alkali metal pyrophosphate as described above we may treat the precipitate during the subsequent washing step, described above, with equally satisfactory results. By the term tetra alkali metal pyrophosphate, we contemplate both the tetrasodium and tetrapotassium pyrophosphate.

The filtered precipitate is then dried and milled to a fineness satisfactory for incorporation into dentifrice compositions.

Our invention may be specifically described by the following example: To 930 gallons of water contained in a reaction vessel, add 2745 pounds of 60% $P_2O_5$ phosphoric acid. Now adjust the acid-water solution to 16° Bé. by adding water as necessary. Add a 9° Bé. lime slurry, which has been heated to a temperature between 30–35° C., which addition may be rapid at first, then with a gradually diminishing speed until the addition is very slow near the endpoint. The temperature of the reaction mixture is maintained in the neighborhood of 45° C. during the reaction period. The end point is reached when 10 cc. of the mother liquor from the reaction mixture requires between 1.8 and 2.5 cc. of N/10 normal NaOH to give the phenolthalein endpoint.

After the endpoint is reached the mixture is agitated for ½ hour, the precipitate allowed to settle and the mother liquor is decanted off. Now add 370 gallons of water to the precipitate and agitate, then add from ½% to 1¼% of tetrasodium pyrophosphate based upon the weight of the precipitate, to the solution, heat to 65–75° C. for ½ hour keeping the pH of the mother liquor between 7.2 and 7.4 during this period by the addition of more tetrasodium pyrophosphate as necessary. At the end of the heating period allow the precipitate to settle and decant off the mother liquor. Now add 370 gallons of water, agitate the precipitate for 5 minutes, again allow the mother liquor to settle and decant the mother liquor. Now add approximately 740 gallons of water, agitate the precipitate and separate the precipitate by filtration. The filter cake is then dried in a vacuum drier and ground to a suitable fineness.

The preparation as above described yields a crystalline dicalcium phosphate dihydrate dentifrice base of great stability upon storage and without the objectionable setting up tendency of the ordinary form of dicalcium phosphate. The dicalcium phosphate dihydrate as described may be incorporated into paste by the addition thereto of glycerine, gums, flavors, wetting agents etc. Tooth powder may be also compounded using dried flavoring materials, soaps, wetting agents, etc.

Due to the method of preparation of my improved form of dicalcium phosphate dihydrate, there is no large amount of the alkaline tetraphosphate present in the product. It is possible that a small amount of this material is adsorbed upon the surface of the dihydrate crystals, but the majority of the alkaline tetraphosphate appears to be decomposed, being largely deposited as an insoluble pyrophosphate (alkaline earth metal pyrophosphate) and in this way gives the desired stability to the final product. The amount so deposited will be equivalent to 60% to 80% of the alkali metal pyrophosphate added. The content of alkali metal pyrophosphate equivalent, in the product will be from 0.30% to 0.60%.

The amount of alkali metal pyrophosphate will vary with the amount of this material added to the dicalcium phosphate precipitate. For example in a series of three experiments, in which respectively 0.7%; 1.25% and 2.5% of tetrasodium pyrophosphate was added to the dicalcium phosphate dihydrate the following quantities were found associated with the precipitate.

| $Na_4P_2O_7$ added | Equivalent $Na_4P_2O_7$ found | | |
|---|---|---|---|
| | Basis Na | Basis $P_2O_7$ | Per cent of added[1] |
| Per cent | Per cent | Per cent | Per cent |
| 0.7 | 0.35 | 0.50 | 71 |
| 1.25 | -------- | 0.75 | 60 |
| 2.50 | 0.52 | 2.0 | 80 |

[1] Based upon $P_2O_7$ found.

From the above data it is evident that the major proportion of the pyrophosphate is present as calcium pyrophosphate. Some may also be present in the form of a complex such as sodium calcium pyrophosphate.

One important characteristic of our stabilized dicalcium phosphate is that it possesses a lower absorption index than unstabilized material.

For example unstabilized dicalcium phosphate dihydrate will have a glycerine absorption index of 76 whereas the product produced by our herein described process will have an absorption index of 66.

What we claim is:

1. A stabilized precipitated dicalcium orthophosphate dihydrate in crystalline form having deposited thereon a sodium calcium complex and containing between 0.50% and 2.0% of equivalent $Na_4P_2O_7$ based upon contained $P_2O_7$, and between 0.35% and 0.52% of the same material based upon contained Na.

2. The method of preparing dicalcium phosphate dihydrate comprising precipitating dicalcium phosphate dihydrate by the reaction in aqueous suspension, between lime and phosphoric acid and then washing said precipitate with a solution of tetra alkali metal pyrophosphate.

3. The method described in claim 2 in which tetra alkali metal pyrophosphate is tetrasodium pyrophosphate.

4. The method described in claim 2 in which the precipitate is washed with between ½% and 1¼% of tetrasodium pyrophosphate in solution, said percentages being calculated upon the weight of said precipitate.

5. A finely divided dicalcium phosphate suitable for use as a dental polishing agent, comprising dicalcium phosphate dihydrate crystals containing a small proportion of tetra alkali metal pyrophosphate adsorbed upon said crystals.

6. Dicalcium phosphate dihydrate crystals containing a minute amount of tetra sodium pyrophosphate adsorbed from a water solution upon said crystals and stabilized thereby against loss of water of hydration.

7. Dicalcium phosphate in the form of minute crystals suitable for use as a dental polishing agent, comprising essentially the crystaline compound $CaHPO_4.2H_2O$ and having associated therewith a minor proportion of a substantially insoluble complex sodium calcium pyrophosphate.

HENRY V. MOSS.
MAURICE G. KRAMER.